Nov. 26, 1968 S. J. NISKIN 3,412,498
APPARATUS FOR PROCURING OCEANOGRAPHIC SAMPLES
Filed Jan. 20, 1966 2 Sheets-Sheet 1

INVENTOR.
Shale J. Niskin
BY

Nov. 26, 1968          S. J. NISKIN          3,412,498
APPARATUS FOR PROCURING OCEANOGRAPHIC SAMPLES
Filed Jan. 20, 1966                    2 Sheets-Sheet 2

INVENTOR.
Shale J. Niskin
BY

United States Patent Office 3,412,498
Patented Nov. 26, 1968

3,412,498
APPARATUS FOR PROCURING OCEANOGRAPHIC SAMPLES
Shale J. Niskin, Miami, Fla., assignor to University of Miami, Miami, Fla., a corporation of Florida
Filed Jan. 20, 1966, Ser. No. 521,995
4 Claims. (Cl. 43—8)

ABSTRACT OF THE DISCLOSURE

A plankton sampling net is provided with a towing line, a throttling line and a bundling line. The net lines are connected to a towing cable by a bolt-type, lever operated release mechanism. The net is initially bundled in closed condition and the towing and bundling lines are releasably secured to the bolt. A first messenger sent down to the cable operates the bolt releasing the bundling line to permit the net to open. A second messenger sent down the cable operates the bolt again to release the towing line and the throttling line becomes effective to close the net.

---

The present invention relates generally to oceanographic apparatus and, more particularly, to an arrangement for carrying out an underwater sampling operation for a selective period of time.

In marine biological research, there is oftentimes the need for procuring samples of marine life at different ocean depths. In the past, the devices employed for obtaining these samples have been generally unsatisfactory because of their complexity and unreliability. For example, in one type of prior art system, the sampling net must be streamed from the vessel with a multiplicity of control lines, and these lines frequently foul on the towing cable during the lowering operation. Additionally, and equally as important, the closing of the net is sometimes ineffective so that the sampling operation is not terminated at the time intended.

It is accordingly a primary object of the present invention to provide a towing arrangement for selectively operating an oceanographic sampling device whereby this device can be rendered effective at any depth and for any period of time.

Another object of the present invention is to provide a system for opening a sampling net at a given time and for closing it any desired time later.

A still further object of the present invention is to provide a remote control release mechanism which can be operated by a pair of messengers for sequentially releasing, for example, a line and a net ring secured thereto.

Figure 1:
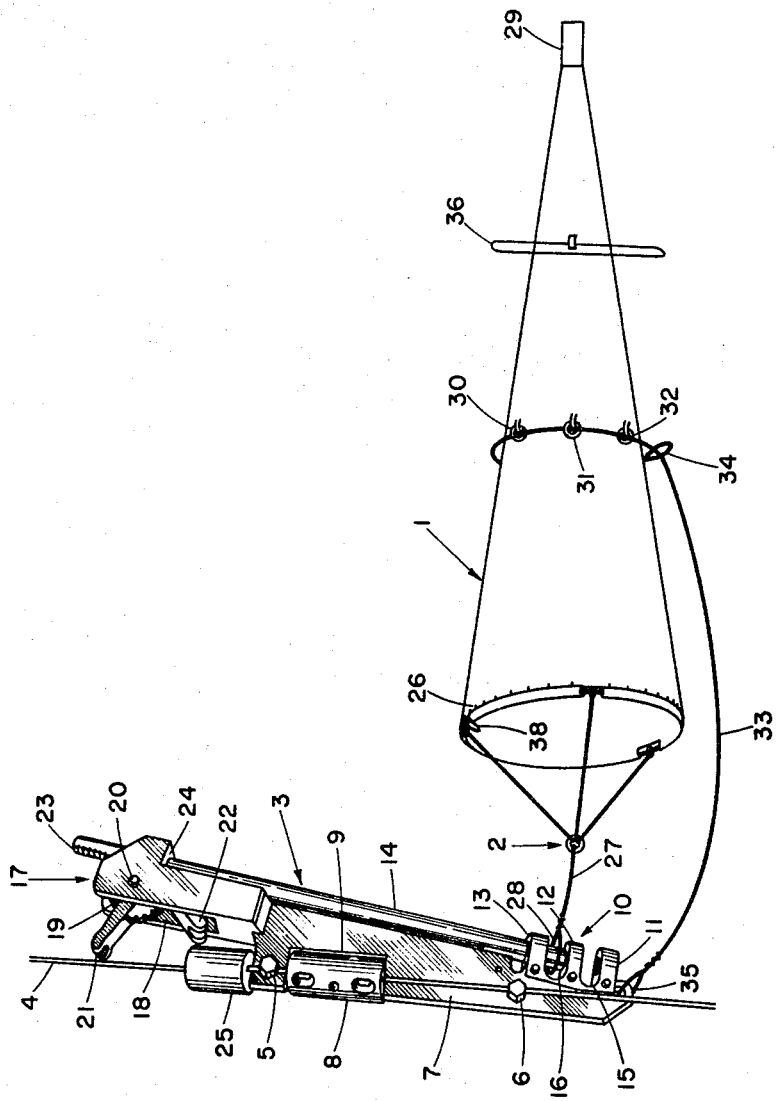
Figure 2:
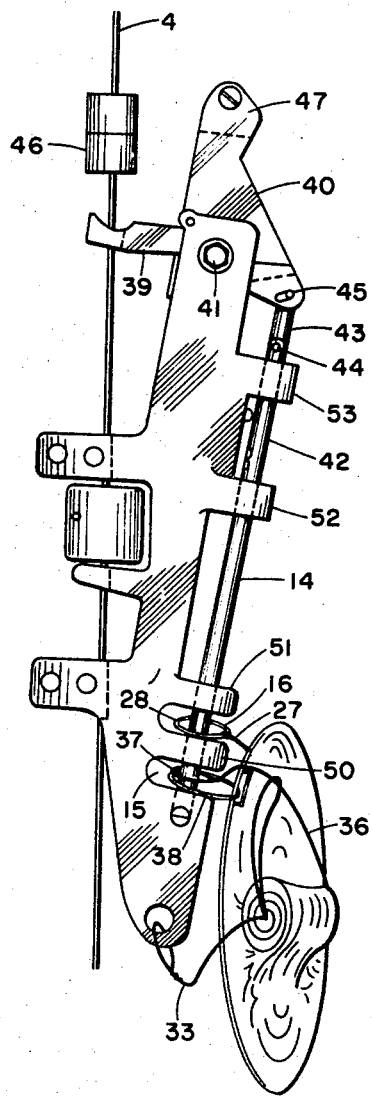

Other objects, advantages and novel features of the invention will become apparent from the following detailed description of the invention when considered in conjunction with the accompanying drawings wherein:

FIG. 1 illustrates the apparatus in the sampling mode with the towing bridle of the plankton net secured to the release mechanism; and FIG. 2 shows a modification of the apparatus in its standby condition with the net rolled up and secured to the lower latch of the release mechanism.

Briefly, the above objects of invention are realized by utilizing at the towing point of the over-all system a remote controlled release mechanism which has two latches that can be opened in sequence by messengers dropped down the towing cable. In the particular case where this release mechanism is utilized to control the opening and closing of a plankton net, the net is first rolled up tight and secured in a closed condition to the first operated latch. When this latch is opened by a messenger, the net unrolls and is thereafter towed in an opened condition with its towing bridle secured to the second latch. To terminate the sampling operation, a second messenger is sent down the towing cable. This messenger opens the second latch and disconnects the towing bridle from the release mechanism. Thus released, the plankton net falls away from the towing cable until a throttling line, wound loosely around the lateral center of the net and permanently connected to the release mechanism, becomes taut and draws the net closed at a location forward of the sampling collector. The net is recovered in this throttled condition with the strain on the throttle line, due to the drag of the net, maintaining it closed during the retrieval operation.

Referring now to FIG. 1 of the drawings which illustrates an arrangement for procuring plankton samples, it will be seen that the plankton net, which is generally represented by reference character 1, when in its sampling mode, is towed from a bridle 2 that is attached to a release mechanism 3. This mechanism is held onto the towing cable 4 by a pair of bolts 5 and 6 which pass through a V-shaped plate portion 7 of the mechanism and are locked to it by suitable wing nuts, not shown. Clearance holes are cut through the heads of these bolts and the towing cable passes through them. With this type of support, the release mechanism 3 and the net are free to pivot about the towing cable. Their vertical position on the cable is fixed by a wire clamp 8 which is secured to the towing cable at any selected point and fits into a rectangular cutout portion 9 of plate 7.

Secured to the lower, rear edge of plate 7 and extending backwardly therefrom is a latch cage 10 having three vertically spaced, closed collars 11, 12 and 13. Cooperating with this cage is a tripping rod 14 which is arranged to project through all three collars in one of its positions. This rod, as will be seen hereinafter, can be withdrawn from the latch cage in two separate movements by a pair of messengers dropped down the towing line to open first the lower latch 15 and then the upper latch 16.

Extending upwardly from the top of plate 7 is a housing 17 which slopes backwardly away from the towing cable 4. This housing has an interior space 18 which accommodates a gear 19 that is mounted for rotation about a transverse shaft 20. Attached to this gear are a pair of angularly spaced arms 21 and 22. These arms have clawed ends which straddle or confront the towing cable when they are in a position corresponding, for example, to that occupied by arm 21. Gear 19 meshes with a rack 23 which is affixed to the rear surface of tripping rod 14 at a location adjacent its upper end. Rod 14 is maintained in proper alignment by a suitable clearance aperture cut through a flange portion 24 of housing 17.

It will be appreciated that when arm 21 is in the position shown any messenger, such as 25, sent down the towing cable will strike its clawed end and displace it counterclockwise to the position occupied by 22. And this displacement will cause gear 19 to rotate through a fixed angular amount, lifting tripping bolt 14 upward a given distance. By appropriate design, this distance is made to correspond to that separating the adjacent collars, such as 11 and 12, of latch cage 10.

In its standby condition, release mechanism 3 is set with arm 22 confronting towing cable 4. In this position, tripping rod 14 extends through all three collars 11, 12 and 13 of latch cage 10. Thus, both latches 15 and 16 are closed. It will be recognized that a first messenger dropped down the towing line will rotate arms 21 and 22 to the position shown, opening lower latch 15 while keeping upper latch 16 closed. Likewise, a second messenger dropped down the line will rotate arm 21 to the position arm 22 occupies in this figure, opening upper latch 16. To prevent triggering rod 14 from being raised too high or to preclude the possibility of pre-tripping, a drag or detent, not shown, may be placed across the teeth of gear 19.

Sampling net 1 has a ring 26 at its mouth portion and, secured to this ring at three spaced points, is the towing bridle 2. Line 27 of this bridle terminates in a closed loop 28 through which tripping rod 14 passes when the apparatus is in its standby condition and in its sampling mode.

Fastened around net 1 at a location forward of the sampling collector 29 are a plurality of rings, such as 30, 31 and 32. A throttling line 33 is threaded through these rings. This line is fashioned into a slip noose 34 at that end thereof which is tied to net 1, while its other end is tied to a suitable aperture 35 cut in the apex portion of plate 7. Throttling line 33 has a length such that when net 1 is towed from bridle 2 there is sufficient slack present in this line to prevent the noose portion thereof, which encompasses the net, from being drawn closed.

The procedure for preparing, launching and operating the plankton net is as follows: First, the net is rolled up from its tail end into a compact bundle. This bundle, which is perhaps best shown in FIG. 2, is held together by a retaining line 36. As best illustrated in FIG. 1, this closed line is attached to the net at a location slightly forward of the sampling collector 29. More particularly, line 36 is formed into a slip noose by being passed through itself, and the free closed end thereof, 37, is inserted into the lower latch 15 of the release mechanism.

To hold the rolled net in place against the release mechanism, a small ring 38 linked to ring 26 is also inserted into this same latch. Lastly, the loop in the end of line 27 is inserted into the upper latch 16 and the triggering rod 14 moved downwardly to its lowermost position.

The release mechanism illustrated in FIG. 2 is somewhat different from that depicted in FIG. 1 in that, instead of employing a gear and rack arrangement for lifting tripping rod 14, this modification makes use of a pair of levers 39 and 40 pivotally connected to shaft 41 for accomplishing this result. In this alternative apparatus, the tripping rod 14 is made in two parts, link 42 and link 43, which are pivotally connected at 44. Upper link 43 is secured to one arm of lever 40 by a suitable pivotable connection 45. The purpose of making the tripping rod in two parts is to provide for the rotary movement of lever 40 when it is first rotated counterclockwise by messenger 46 striking its arm 39 and again rotated in the same direction when a second messenger strikes its other arm 47. The two-part construction of rod 14, in other words, allows upper link 43 to follow the rotation of lever 40 without interfering with the vertical movement of link 42.

When the apparatus is in the condition shown in FIG. 2, it is ready for lowering. When it is lowered to the desired depth, it is only necessary for a weighted messenger, such as 25 in FIG. 1 or 46 in FIG 2, to be dropped down the towing line to start the sampling operation. When this messenger strikes the confronting arm 39 of the modification of FIG. 2 or arm 22 of the modification of FIG. 1, it will cause the lower latch 15 to be opened. Ring 38 and loop 37 will be freed and the net will unroll and fall back from the line until it is towed from its bridle 2, as shown in FIG. 1. It will remain in this sampling mode until a second messenger is sent down the towing cable. This messenger will strike arm 47 of lever 40 in the modification of FIG. 2, or arm 21 in the modification of FIG. 1, lift the tripping rod 14 to its uppermost position, and open the upper latch 16. Towing line 27 will be released and the net in its open condition will fall further back from the towing line until the slack is taken up on throttling line 33. The continued drag of the net will cause loop 34 to close and the tail portion of the net which accommodates the plankton sampler 29 will be effectively sealed off from its mouth portion. The weight of the net plus its drag will keep sufficient tension on throttling line 33 after the termination of the sampling operation and during the retrieval operation to hold the net closed until it is recovered at the surface. Thus, there is no sampling of any marine life at depths other than that at which the net was previously towed in an open condition.

In the modification of FIG. 2, it would be pointed out, levers 39 and 40 are adapted to rotate past the towing cable 4 during the operation of the release mechanism. These two levers can be made into a single, complex lever, if desired. Also, in this modification only two collars, 50 and 51, are needed in the latch mechanism, and these both can be constructed from a simple strap bent into a closed loop. An additional, upper pair of loops 52 and 53 can also be formed in a similar manner to guide the vertical movement of tripping rod 14.

It would be pointed out that since the plankton net is not streamed during the lowering operation, it is not subject to any appreciable wear or damage. Also, its rolled up condition during the lowering operation eliminates any danger of its control lines fouling.

The principle of operation hereinbefore described can also be employed to procure water samples. In this case, the water sample bag, which has the same general shape as the plankton net, is made watertight with a long tail through which a hose may be introduced so that the bag may be pumped of its contents at the surface. The water bag is fitted with a pliable funnel located just behind the point of attachment of the throttle line. When the bag is throttled, this funnel collapses, thus prevenitng any water from escaping from the bag during the recovery operation.

What is claimed is:

1. Apparatus for use in an oceanographic system of the type wherein a sampling device is towed through the water to procure samples of marine material present at given depths, the combination of
   a towing cable extending from the ocean surface down to the depth at which said samples are to be procured;
   a release mechanism attached to said towing cable at a location corresponding to said depth,
      said release mechanism having first and second latches,
      means on said release mechanism for opening said first and second latches in succession;
   a pair of weighted messengers adapted to be dropped in succession down said cable from said surface to operate said means for releasing said first and second latches;
   a sampling device,
      said sampling device having means for holding the same in an open condition in which it is capable of collecting marine material and means for holding the same in a closed condition in which it is capable of retaining said collected marine material;
   means for securing said sampling device to said release mechanism in a folded and unfolded open condition such that when said first and second latches are closed said sampling device is prevented from unfolding to collect any marine material until released by opening said first latch in response to the first of said pair of messengers being dropped down said towing line, said sampling device thereafter unfolding and remaining in an open condition until the second of said messengers is dropped down said towing line and opens said second latch.

2. In an arrangement as defined in claim 1 wherein said release mechanism includes
   a latch cage having three spaced, closed collars;
   a tripping rod adapted to pass through all of said collars when set in one of its positions; and
   said means operated by said pair of weighted messengers sequentially dropped down said towing cable lifting said tripping rod when it is in said one position in two separate steps, whereby said tripping rod is withdrawn first from between the lower pair of collars, and said first latch opened, and thereafter from between the upper pair of collars, and said second latch opened.

3. In an arrangement as defined in claim 2 wherein said means operated by said weighted messengers for opening said first and second latches further includes a gear mounted for rotation about a transverse shift;

a rack secured to said tripping rod and extending along one surface thereof,
  said rack adapted to mesh with said gear; and a pair of arms secured to said gear,
  said arms being angularly spaced with their free ends in selected positions confronting said towing cable whereby said first messenger dropped down said towing cable strikes the free end of one of said arms and causes said gear to rotate through a predetermined angular amount and said second messenger dropped down said towing cable strikes the free end of the other arm and causes said gear to again rotate through a predetermined angular amount.

4. In an arrangement as defined in claim 1 wherein said sampling device includes a conically shaped net;

a plankton storage container positioned at the tail end of said net;

said means for securing said sampling device in unfolded condition to said release mechanism includes a towing bridle connected between the mouth of said net and said second latch; and said means for holding said sampling device in said closed condition includes a throttling line,
  said throttling line having one end thereof connected to said release mechanism and the other end thereof fashioned into a slip noose which encircles said conically-shaped net at a position towards the mouth of said net which is forward of the location of said storage container,
  said throttling line having a length such that when said net is towed from said towing bridle there is sufficient slack in said throttling line so that said slip noose remains opened and does not throttle said net.

References Cited
UNITED STATES PATENTS

| | | | |
|---|---|---|---|
| 1,651,607 | 12/1927 | Kurtz | 294—75 |
| 2,391,978 | 1/1946 | Kahl | 73—421 X |
| 2,716,832 | 9/1955 | Minnie | 43—43.12 |
| 2,720,047 | 10/1955 | Isaacs | 43—7 |
| 2,744,350 | 5/1956 | Bass | 43—9 |
| 2,994,622 | 8/1961 | Miller | 43—43.12 X |
| 3,163,401 | 12/1964 | Johnston et al. | 294—75 X |

WARNER H. CAMP, *Primary Examiner.*